Patented Aug. 24, 1926.

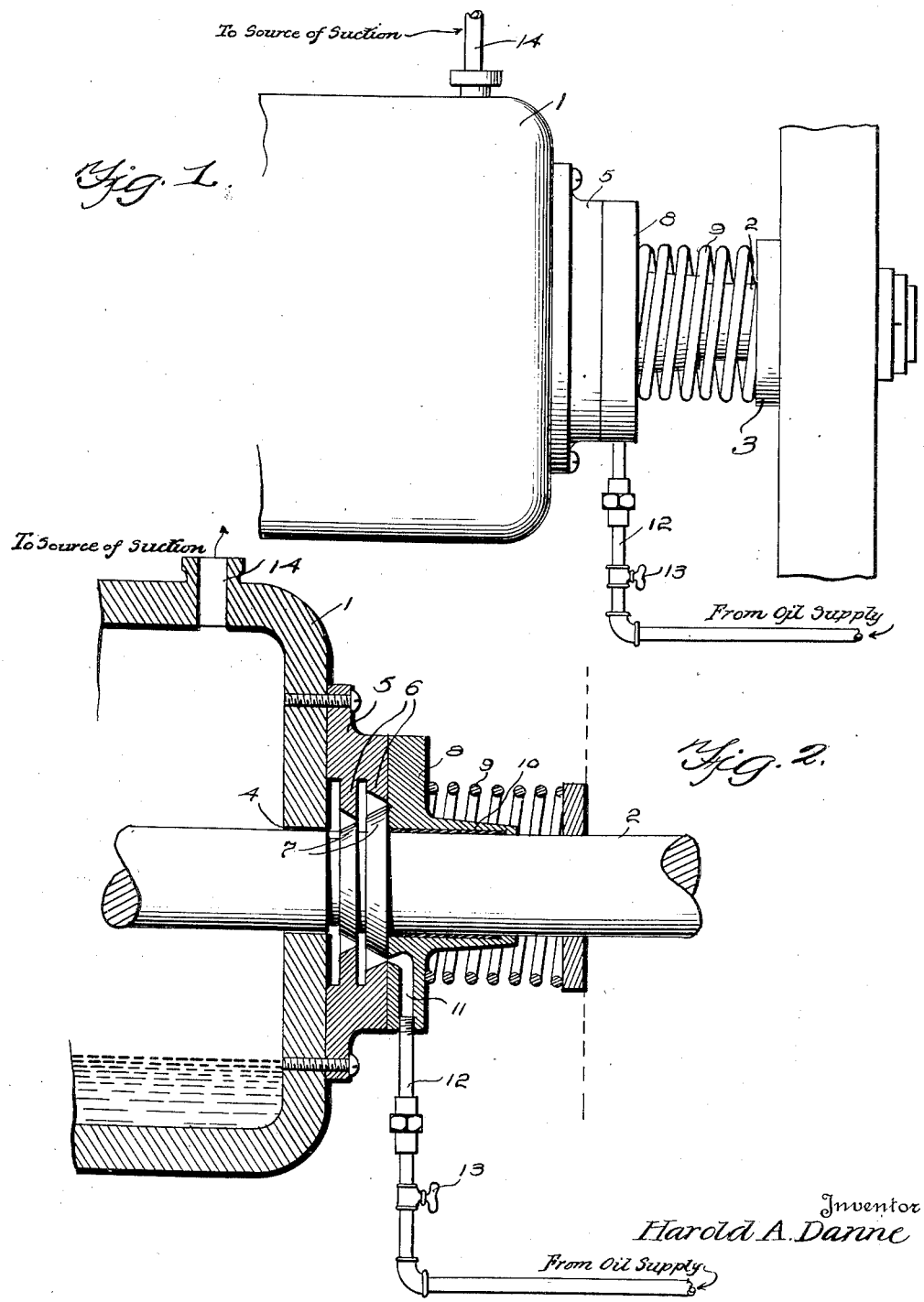

1,597,147

UNITED STATES PATENT OFFICE.

HAROLD A. DANNE, OF NEW YORK, N. Y.

APPARATUS FOR CONTROLLING THE SUPPLY OF LIQUIDS.

Application filed July 27, 1920. Serial No. 399,355.

This invention relates to methods of and apparatus for controlling the supply of liquids in liquid delivery systems, such as oiling systems for lubricating machinery, and it comprises a method wherein a vacuum is maintained at the point where the liquid is stored or placed for lubrication and the oil held therein with a tendency to move inwardly due to the suction, and thus minimize leaks and other loss of oil.

The invention further comprises an apparatus whereby lubricating oil in a bearing or similar part of machinery is prevented from creeping outwardly along the moving parts of the machine, or leaking through the joints in the tank or bearing by suction tending to draw the oil inwardly, such apparatus including means for maintaining a vacuum within the tank or bearing.

In lubricating systems for machinery of various sorts, the oil is supplied to the bearings and other parts to be lubricated, under pressure, and the pressure within the bearing or other oil container forces the oil outwardly. Various types of packing are employed on shafts and other revolving parts, to prevent leakage of oil, due to this outward pressure, but it has been found that a certain amount of oil will creep along the shafts and other revolving parts even when such parts are provided with packing. In the present invention, I have overcome this objection by connecting the bearing to a source of suction and maintaining a vacuum therein, the oil being delivered inwardly along the shaft for the purpose of lubrication, and excess oil being returned from the bearing to the source of supply. The suction drawing the oil inwardly overcomes any tendency toward creeping and removes this objection of present lubricating systems.

In the accompanying drawings, I have shown one embodiment of the invention. In this showing:—

Figure 1 is an elevation of a bearing showing the invention applied to lubricating systems, and Figure 2 is a central vertical sectional view thereof.

Referring to Figures 1 and 2 of the drawings, the reference numeral 1 designates, generally, a bearing, gear box, or other part of a piece of machinery through which lubricating oil passes. In the usual pressure or gravity lubricating systems, a pressure greater than atmospheric pressure is created in such parts of machinery after the machinery has been run for a short while, and lubricating oil tends to creep or move outward on drive shaft 2, passing through the bearings thereof. The drive shaft carries a revolving element 3, which may be the hub of a wheel or any other similar element. The casing or gear box is provided with an opening 4 through which the shaft passes, the opening being slightly larger than the diameter of the shaft to permit passage of oil for lubricating purposes. A plate 5 is attached thereto, and this plate is provided with a plurality of annular ribs or projections 6 having conical faces, as shown. The shaft is provided with similar projections or ribs 7 arranged in alinement with the projections carried by the plate and provided with conical faces extending in the opposite direction. The spaces between the edges at the bases of the cones is very small to break up oil passing therethrough. A collar 8 is arranged on the shaft and is held against the plate 5 by a coil spring 9. Suitable packing 10 may be arranged between the collar and the shaft. The collar is provided with a port 11 communicating with the opening in plate 5 and with an oil supply pipe 12. As shown, the pipe may be provided with a valve 13, whereby the supply of oil may be cut off and regulated. The gear box or casing is provided with an opening 14 connected to a suitable source of suction, such as a fan or air pump (not shown).

In the operation of the invention oil is supplied to the bearing through supply pipe 12, passing through port 11 in collar 8, to the opening in plate 5. The rotation of the shaft 2 causes the oil within the space between the outer flanges 6 and 7 to be thrown outwardly, the centrifugal force of the outer flange 7 continually urging the oil outwardly radially of the shaft from whence it passes along the inner surface of the outer flange 6 assisted by the action of the vacuum within the casing. The oil flows inwardly along the outer face of the inner flange 6 and into the opening between the inner faces 6 and 7 assisted again by the vacuum within the casing. The same action is repeated between the inner flanges 6 and 7, the oil flowing inwardly along the inner face of the flange 6 from whence it finds its way into the casing under the influence of the vacuum therein. The bushing 10 is supplied by oil through capillary attraction since the degree of vacuum maintained within the casing is slight. The suction through pipe 14 draws the oil inwardly at all times and overcomes any tendency toward creeping outwardly along the shaft into the packing 10 and thus overcomes the objection to lubricating systems wherein pressure is employed or gravity feed, under which system a pressure is established in the casing.

It is to be understood that the form of my invention herewith shown and described is to be taken as a preferred example of the same, and that various changes in the shape, size, and arrangement of parts may be resorted to, without departing from the spirit of my invention or the scope of the subjoined claim.

Having thus described my invention, I claim:—

Lubricating apparatus comprising a casing having an opening therein, a revolving member passing through said opening, said revolving member being provided with an annular flange, a plate secured to said casing and surrounding said revolving member, said plate being provided with an internal annular flange encircling said revolving member, the faces of said flanges remote from said casing lying in a common plane transverse to the axis of said revolving member, said flanges being tapered whereby the distance between their adjacent faces increases toward said casing, the space between said flanges at their nearest point being restricted, means for delivering oil directly to the space between said flanges, and means for connecting suction creating means to the casing.

In testimony whereof I affix my signature.

HAROLD A. DANNE.